United States Patent
Naito

(10) Patent No.: US 10,345,796 B2
(45) Date of Patent: Jul. 9, 2019

(54) CELL CONTROLLER AND PRODUCTION SYSTEM FOR MANAGING WORKING SITUATION OF A PLURALITY OF MANUFACTURING MACHINES IN MANUFACTURING CELL

(71) Applicant: FANUC CORPORATION, Yamanashi (JP)

(72) Inventor: Genzo Naito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 76 days.

(21) Appl. No.: 15/411,866

(22) Filed: Jan. 20, 2017

(65) Prior Publication Data
US 2017/0212507 A1    Jul. 27, 2017

(30) Foreign Application Priority Data

Jan. 21, 2016  (JP) .................................. 2016-009764

(51) Int. Cl.
*G05B 19/418*   (2006.01)

(52) U.S. Cl.
CPC ... *G05B 19/4188* (2013.01); *G05B 19/41865* (2013.01); *G05B 2219/31356* (2013.01);
(Continued)

(58) Field of Classification Search
CPC ........................... G05B 19/4188; G05B 19/418
See application file for complete search history.

(56) References Cited

U.S. PATENT DOCUMENTS

| 6,535,769 B1* | 3/2003 | Konar ................. G05B 19/058 700/108 |
| 2002/0035497 A1* | 3/2002 | Mazereeuw ....... G05B 23/0283 702/188 |
| 2003/0204281 A1* | 10/2003 | Su .................... G05B 19/41865 700/108 |

(Continued)

FOREIGN PATENT DOCUMENTS

| CN | 101373379 A | 2/2009 |
| CN | 102937798 A | 2/2013 |

(Continued)

*Primary Examiner* — Vincent H Tran
(74) *Attorney, Agent, or Firm* — Hauptman Ham, LLP

(57) ABSTRACT

A cell controller includes a plurality of sensors for detecting the state of a plurality of manufacturing machines, a state storing unit for storing the state of each manufacturing machine, a breakdown information acquiring unit for acquiring breakdown information of each manufacturing machine, an input unit for inputting recovery operation information when each manufacturing machine stops, a recovery operation information storing unit for storing the recovery operation information of each manufacturing machine, and a correlation data generating unit. The correlation data generating unit generates correlation data obtained by correlating the breakdown information acquired by the breakdown information acquiring unit with the recovery operation information stored by the recovery operation information storing unit in each manufacturing machine, and transmits the same to the database. These configurations enable an operator to easily acquire, when a manufacturing machine in a manufacturing cell stops, a recovery operation most appropriate to the manufacturing machine.

6 Claims, 9 Drawing Sheets

(52) U.S. Cl.
CPC .............. *G05B 2219/31434* (2013.01); *G05B 2219/32397* (2013.01); *G05B 2219/45213* (2013.01); *Y02P 90/087* (2015.11); *Y02P 90/14* (2015.11); *Y02P 90/20* (2015.11)

(56) References Cited

U.S. PATENT DOCUMENTS

| | | | | |
|---|---|---|---|---|
| 2004/0102864 A1* | 5/2004 | Stack | ................... | A24C 5/3412 700/110 |
| 2010/0083029 A1* | 4/2010 | Erickson | ............. | G06F 11/0709 714/2 |
| 2010/0312522 A1* | 12/2010 | Laberge | ............. | G05B 23/0227 702/184 |
| 2012/0016607 A1* | 1/2012 | Cottrell | ............. | G05B 23/0229 702/62 |
| 2014/0358480 A1* | 12/2014 | Raquel | ............... | G01N 21/9501 702/184 |
| 2015/0127979 A1* | 5/2015 | Doppalapudi | ...... | G06F 11/0709 714/15 |
| 2015/0227404 A1* | 8/2015 | Rajagopal | ........... | G06F 11/0748 714/37 |

FOREIGN PATENT DOCUMENTS

| | | |
|---|---|---|
| CN | 104391480 A | 3/2015 |
| JP | 10-240806 A | 9/1998 |
| JP | 2934026 B2 | 8/1999 |
| JP | 2004-178492 A | 6/2004 |
| JP | 2008-310582 A | 12/2008 |
| JP | 4873267 B2 | 2/2012 |
| JP | 5436460 B2 | 3/2014 |
| WO | 2015/045851 A1 | 4/2015 |

* cited by examiner

FIG. 2

| MANUFACTURING MACHINE ID | BREAKDOWN INFORMATION | | | RECOVERY OPERATION INFORMATION | | |
|---|---|---|---|---|---|---|
| | STATE 1 | STATE 2 | ... | OPERATION 1 | OPERATION 2 | ... |
| WF005 | REDUCTION IN CURRENT VALUE OF MOTOR | ABNORMALITY IN OUTPUT OF POSITION DETECTOR | ... | REMOVAL OF WORKPIECE | ADJUSTMENT OF FORCE SENSOR | ... |
| RD002 | ABNORMALITY IN OUTPUT OF TORQUE OF MOTOR | BREAKAGE OF DRILL | ... | REPLACEMENT OF DRILL | ADJUSTMENT OF TORQUE OF MOTOR | ... |
| SF011 | ABNORMALITY IN OUTPUT OF TORQUE OF MOTOR | ABNORMALITY IN SPEED OF MOTOR | ... | RESUPPLY OF SCREWS | REPLACEMENT OF WORKPIECE | ... |
| | | | | | | |

CELL CONTROLLER AND PRODUCTION SYSTEM FOR MANAGING WORKING SITUATION OF A PLURALITY OF MANUFACTURING MACHINES IN MANUFACTURING CELL

RELATED APPLICATIONS

The present application claims priority to Japanese Patent Application Number 2016-009764 filed Jan. 21, 2016, the disclosure of which is hereby incorporated by reference herein in its entirety.

BACKGROUND OF THE INVENTION

1. Field of the Invention

The present invention relates to a cell controller for controlling a manufacturing cell, and a production system for managing the working situation of a plurality of manufacturing machines in the manufacturing cell.

2. Description of the Related Art

In a machine factory, a manufacturing cell, for example, a manufacturing line is constructed by a plurality of manufacturing machines, such as machine tools or robots. When such a manufacturing cell is used to manufacture products, reduction in the operation rate of the manufacturing machines reduces the volume of production of the products. Thus, when a problem occurs in any of the manufacturing machines in the manufacturing cell, an operator needs to determine the source in the manufacturing machine in order to recover the manufacturing machine as soon as possible. However, when the operator is not an expert, it takes a significant amount of time to find an appropriate way to cope with the problem, and accordingly, the recovery of the manufacturing machine is delayed.

Japanese Patent No. 2934026 discloses a production system, which identifies an abnormal manufacturing machine while referencing operation data of each manufacturing machine, which deduces a method to cope with the abnormal manufacturing machine, and which performs an automatic correction based on the inference.

Japanese Patent No. 4873267 discloses a production system, which analyzes the previous condition of a manufacturing machine, when the manufacturing machine stops, in order to classify the same into a plurality of types and which displays information for identifying the condition of the manufacturing machine on a screen in accordance with each type.

Japanese Patent No. 5436460 discloses a production system provided with a teaching unit which automatically teaches an error recovery operation for a robot being in an error state based on an operation history of teaching the robot as a manufacturing machine, and a library unit for storing the content of the error recovery operation.

However, the production system disclosed in Japanese Patent No. 2934026 does not have a function for storing, as data, the method to cope with an abnormality arising in the manufacturing machine, and updating the same. Thus, in the production system disclosed in Japanese Patent No. 2934026, even when an abnormality, which is similar to the past abnormality, arises in the manufacturing machine, the method to cope with the abnormality should be deduced again.

The production system disclosed in Japanese Patent No. 4873267 only informs an operator of information for specifying the state of the manufacturing machine being at a stop, and does not have a function for storing and outputting the content of an error recovery operation performed for a trouble of the manufacturing machine being at a stop. Thus, when the operator is difficult to find out a method to cope with the informed state of the manufacturing machine, the recovery of the manufacturing machine is delayed.

The production system disclosed in Japanese Patent No. 5436460 is prepared for an environment having no interference from an operator, and does not have a function for informing, when an error state arises in the manufacturing machine, the operator of the content of an error recovery operation most appropriate to the error state. Thus, in the production system disclosed in Japanese Patent No. 5436460, the recovery of the manufacturing machine is delayed in some cases, in a task for which an operator is needed.

SUMMARY OF THE INVENTION

The present invention provides a cell controller and a production system, which enable an operator to easily acquire, when a manufacturing machine in a manufacturing cell stops, a recovery operation most appropriate to the manufacturing machine.

According to a first aspect of the present invention, there is provided a cell controller, which is communicably connected to a host computer having a database and which controls a manufacturing cell containing a plurality of manufacturing machines. The cell controller includes a plurality of sensors which detect a state of each of the plurality of manufacturing machines, a state storing unit which stores the state of each of the manufacturing machines detected by the sensors, a breakdown information acquiring unit which is configured to acquire breakdown information of each of manufacturing machines, from state information of each of the manufacturing machines, which is stored in the state storing unit, an input unit which enables an input of recovery operation information to the cell controller when each of the manufacturing machines stops, a recovery operation information storing unit which stores the recovery operation information of each of the manufacturing machines, which is input by the input unit, and a correlation data generating unit which is configured to generate correlation data obtained by correlating the breakdown information acquired by the breakdown information acquiring unit with the recovery operation information stored by the recovery operation information storing unit in each of the manufacturing machines, and configured to transmit the same to the database.

According to a second aspect of the present invention, the cell controller according to the first aspect further includes a recovery operation information retrieving unit which is configured to retrieve, in accordance with the breakdown information acquired by the breakdown information acquiring unit, recovery operation information corresponding to the breakdown information, from the database, and an output unit which outputs the recovery operation information retrieved by the recovery operation information retrieving unit.

According to a third aspect of the present invention, in the cell controller according to the first or second aspect, the correlation data generating unit includes a learning unit which is configured to learn the correlation data using, as a reward, the rate of alarm generation in or the operation rate of each of the manufacturing machines.

According to a fourth aspect of the present invention, the cell controller according to any of the first to third aspects further includes a data discriminating unit which is configured to compare the recovery operation information input from the input unit to the recovery operation information storing unit, with the plurality of correlation data accumulated in the database. When the data discriminating unit finds out recovery operation information similar to the recovery operation information input in the recovery operation information storing unit, from among the plurality of correlation data accumulated in the database, the data discriminating unit is configured to send the similar recovery operation information and the breakdown information associated with the recovery operation information, to the output unit.

According to a fifth aspect of the present invention, the cell controller according to any of the first to third aspects further includes a data discriminating unit which is configured to compare the state information of each of the manufacturing machines, which is stored in the state storing unit, with the plurality of correlation data accumulated in the database. When the data discriminating unit finds out breakdown information similar to the state information stored in the state storing unit, from among the plurality of correlation data accumulated in the database, the data discriminating unit is configured to send the similar breakdown information and the recovery operation information associated with the breakdown information, to the output unit.

According to a sixth aspect of the present invention, in the cell controller according to the fourth aspect, the data discriminating unit includes a learning unit which is configured to learn a criterion for discriminating similarity between the recovery operation information contained in each of the correlation data in the database and the recovery operation information input in the recovery operation information storing unit, using, as a reward, the rate of alarm generation in or the operation rate of each of the manufacturing machines.

According to a seventh aspect of the present invention, in the cell controller according to the fifth aspect, the data discriminating unit includes a learning unit which is configured to learn a criterion for discriminating similarity between the breakdown information contained in each of the correlation data in the database and the state information stored in the state storing unit, using, as a reward, the rate of alarm generation in or the operation rate of each of the manufacturing machines.

According to an eighth aspect of the present invention, the cell controller according to the third, sixth, or seventh aspect further includes a production performance information storing unit which stores production performance information of each of the manufacturing machines, and a calculation unit which is configured to calculate the rate of alarm generation in or the operation rate of each of the manufacturing machines, on the basis of the production performance information of each of the manufacturing machines stored in the production performance information storing unit.

According to a ninth aspect of the present invention, there is provided a production system for managing the working situation of a plurality of manufacturing machines. The production system includes a cell controller according to any of the first to eighth aspects, which controls at least one manufacturing cell containing the plurality of manufacturing machines, and a host computer having a database, which is communicably connected to the cell controller.

BRIEF DESCRIPTION OF THE DRAWINGS

These objects, features, and advantages of the present invention and other objects, features, and advantages will become more apparent from the detailed description of typical embodiments illustrated in the appended drawings.

FIG. 2 is a view of an example of the configuration of correlation data generated by a correlation data generating unit shown in FIG. 1 and stored in a database of a host computer.

DETAILED DESCRIPTION

Figure 1:
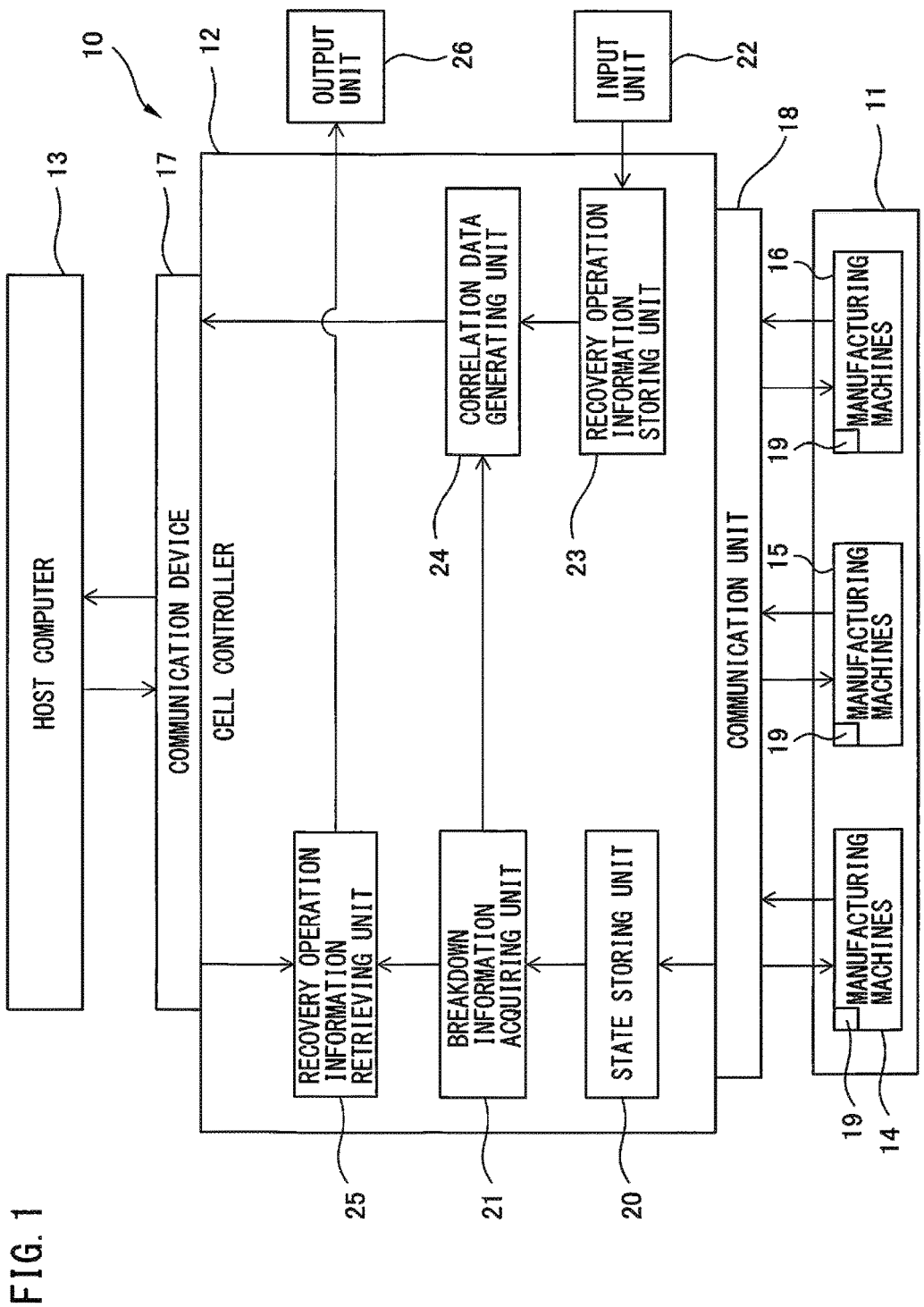
FIG. 1 is a block diagram of the configuration of a production system according to an embodiment.

Embodiments of the present invention will be described below with reference to the drawings. Throughout the figures, similar members or function elements are designated with the same reference numerals. These figures are properly modified in scale to assist the understanding thereof. Further, the embodiments illustrated in the drawings are examples to carry out the present invention, and the present invention is not limited to the illustrated embodiments.

FIG. 1 is a block diagram of an embodiment of a production system according to the present invention.

With reference to FIG. 1, a production system 10 is provided with at least one manufacturing cell 11, a cell controller 12 for controlling the manufacturing cell 11, and a host computer 13 having a database.

The manufacturing cell 11 is disposed in a factory for manufacturing products. In contrast, the cell controller 12 and the host computer 13 are disposed in a building separated from the factory. For example, the cell controller 12 may be disposed in another building in the same factory site in which the manufacturing cell 11 is disposed. In this instance, it is preferable that the manufacturing cell 11 and the cell controller 12 are interconnected so as to be communicable via a communication device 18, for example, an intranet.

The host computer 13 may be disposed in, for example, an office located away from the factory. In this instance, it is preferable that the cell controller 12 and the host computer 13 are interconnected so as to be communicable via a communication device 17, for example, the internet. In the host computer 13 according to the present embodiment, it is preferable that a computer, which is a production planning device for managing the working situation of a plurality of manufacturing cells 11 or manufacturing machines, is used in the office.

The manufacturing cell 11 is a set obtained by flexibly combining a plurality of manufacturing machines for manufacturing products. The manufacturing cell 11 includes, as shown in FIG. 1, a first manufacturing machine 14, a second manufacturing machine 15, and a third manufacturing machine 16, but the number of manufacturing machines in the manufacturing cell 11 is not limited. The manufacturing cell 11 may also be a manufacturing line in which a workpiece is successively processed, by a plurality of manufacturing machines, into a final product. Alternatively, the manufacturing cell 11 may be a manufacturing line in which two or more workpieces (parts) processed in each of two or more manufacturing machines are combined by another manufacturing machine in the middle of the process, to obtain a final product. Alternatively, in the invention of this application, two or more workpieces processed in two or more manufacturing cells 11 may be combined to obtain a final product.

Each of the manufacturing machines 14 to 16 is, for example, an NC machine tool or an industrial robot. Of course, each manufacturing machine used in the present invention is not limited to an NC machine tool or an industrial robot. Examples of each manufacturing machine may include a PLC, a transfer machine, a measuring instrument, a testing device, a press machine, a press fitting machine, a printing machine, a die casting machine, an injection molding machine, a food machine, a packing machine, a welding machine, a washing machine, a painting machine, an assembling machine, a mounting machine, a wood working machine, a sealing device, or a cutting machine.

Further, it is preferable that the cell controller 12 and the manufacturing machines 14 to 16 are constructed using computer systems (not shown) having CPUs, memories, such as ROMs or RAMs, and communication control units, which are interconnected via a bus line. These communication control units control data passing among the cell controller 12 and the manufacturing machines 14 to 16. It is preferable that the functions or operations of the cell controller 12 and the manufacturing machines 14 to 16 are achieved by programs stored in the ROMs, which are executed by the corresponding CPUs.

The configuration of the cell controller 12 will be described in detail.

As shown in FIG. 1, the cell controller 12 is comprised of sensors 19, a state storing unit 20, a breakdown information acquiring unit 21, an input unit 22, a recovery operation information storing unit 23, a correlation data generating unit 24, a recovery operation information retrieving unit 25, and an output unit 26. The functions of these components will be sequentially described below.

Each sensor 19 is provided in the corresponding one of the manufacturing machines 14 to 16, and detects, at a predetermined time interval, the state of the corresponding one of the manufacturing machines 14 to 16 being in operation. The state storing unit 20 sequentially stores the states of the manufacturing machines 14 to 16, which are detected by the sensors 19 at a predetermined time interval. It is preferable that, in order to detect various states of each of the manufacturing machines 14 to 16, a plurality of sensors 19 are provided at each manufacturing machine. Further, it is preferable that the cell controller 12 is configured to simultaneously process the state information obtained from the sensors 19 disposed in the manufacturing machines.

The breakdown information acquiring unit 21 acquires the breakdown information of each manufacturing machine from the state information of each of the manufacturing machines 14 to 16, which is stored in the state storing unit 20. The breakdown information acquiring unit 21 also transmits the breakdown information to the correlation data generating unit 24 after receiving the same.

Examples of the state information include information on the value of current supplied to a motor for driving an arm of a robot if the manufacturing machines 14 to 16 are robots, information on the output of a position detector attached to the motor, etc. In this instance, the breakdown information is an information group including a plurality of pieces of information regarding, for example, reduction in the current value of the motor when the robot stops due to trouble, and an abnormality in the output of the position detector. It is preferable that such breakdown information include not only the state information of a manufacturing machine at the time of stopping of the manufacturing machine but also the state information of the manufacturing machine in a predetermined period of time prior to the time of stopping of the manufacturing machine. This enables the breakdown information to include a predictive state of the manufacturing machine which will stop due to trouble.

The input unit 22 has a function for inputting recovery operation information, which represents recovery operations performed for the stopping of the manufacturing machines 14 to 16 caused by trouble, to the cell controller 12. Note that the recovery operation information is, for example, operation codes in a list of recovery operations. The list of recovery operations is a table describing the correlation between a plurality of different recovery operations and operation codes each composed of a multi-digit number representing the corresponding recovery operation. Examples of the input unit 22 for inputting such operation codes include a keyboard, a touch panel, etc. The input unit 22 may be provided in each of the manufacturing machines 14 to 16. In this instance, it is preferable that, for example, a teaching operation board for performing a teaching operation for a robot, or a control board of an NC machine tool is used as the input unit 22.

The recovery operation information storing unit 23 stores the recovery operation information input by the input unit 22, and transmits the same to the correlation data generating unit 24. The correlation data generating unit 24 generates correlation data representing the correlation between the breakdown information acquired by the breakdown information acquiring unit 21 and the recovery operation information stored in the recovery operation information storing unit 23 in each of the manufacturing machines 14 to 16.

When the correlation data are generated, it is preferable to correlate the identification data (ID) of each manufacturing machine, the breakdown information transmitted from the breakdown information acquiring unit 21, and the recovery operation information transmitted by the recovery operation information storing unit 23 after the breakdown information, with one another. Alternatively, the correlation data generating unit 24 generates the correlation data while causing a learning unit 27 to learn the same, as described in a first modification (see FIG. 6) that will be described later. The correlation data generated as described above are transmitted from the correlation data generating unit 24 to the host computer 13, and are accumulated in the database of the host computer 13.

The recovery operation information retrieving unit 25 retrieves the recovery operation information corresponding to the breakdown information acquired by the breakdown information acquiring unit 21, from the database of the host computer 13. The output unit 26 outputs the recovery operation information retrieved from the recovery operation information retrieving unit 25 together with the breakdown information acquired by the breakdown information acquiring unit 21. Examples of the output unit 26 include a display device for displaying recovery operations corresponding to the recovery operation information, or a printing device for printing the recovery operations corresponding to the recovery operation information on a sheet, such as a paper. The output unit 26 may be provided in each of the manufacturing machines 14 to 16.

FIG. 2 shows an example of the configuration of the correlation data generated by the correlation data generating unit 24, as described above, and accumulated in the database of the host computer 13. As shown in FIG. 2, the correlation data are generated based on the correlation between the breakdown information of each manufacturing machine and the recovery operation information in each manufacturing machine's ID. Such correlation data are configured as a data table shown in FIG. 2, and the correlation among each manufacturing machine's ID, the breakdown information, and the recovery operation information is made in the corresponding line of the data table.

Specifically, the identification numbers (e.g., WF0005, RD002, SF011) of the manufacturing machines 14 to 16 are written in the table of the manufacturing machine's ID in the correlation data shown in FIG. 2. "WF005" is the identification number of the first manufacturing machine 14 that is a transfer robot. "RD002" is the identification number of the second manufacturing machine 15 that is a drilling robot. "SF011" is the identification number of the third manufacturing machine 16 that is a screw tightening robot.

An information group or data columns including a plurality of pieces of state information representing a plurality of states (state 1, state 2, etc.) detected by the sensors 19 in the manufacturing machines are written in the table of the breakdown information in the correlation data shown in FIG. 2. Further, an information group or data columns including a plurality of pieces of recovery operation information representing a plurality of recovery operations (operation 1, operation 2, etc.) performed when each manufacturing machine is recovered are written in the table of the recovery operation information in the correlation data shown in FIG. 2. For example, in the transfer robot having the manufacturing machine ID "WF005", the breakdown information is an information group including a plurality of pieces of state information, such as reduction in the current of a motor or an abnormality in the output of the position detector. The recovery operation information corresponding to the stopping operation information is an information group including a plurality of pieces of recovery operation information, such as removal of a workpiece or adjustment of a force sensor. In other words, in the transfer robot "WF005", the state information representing reduction in the current of the motor (state 1), the state information representing an abnormality in the output of the position detector (state 2), etc., are simultaneously acquired as the breakdown information of the transfer robot. In accordance with these pieces of breakdown information, an operator performs a plurality of recovery operations (operation 1, operation 2, etc.), such as removal of a workpiece, adjustment of a force sensor, etc., and all pieces of recovery operation information representing these recovery operations are input in the input unit 22. Thus, a plurality of pieces of state information representing state 1, state 2, etc., are written in the table of breakdown information shown in FIG. 2. Further, a plurality of pieces of recovery operation information representing operation 1, operation 2, etc., are written in the table of recovery operation information shown in FIG. 2.

Figure 3:
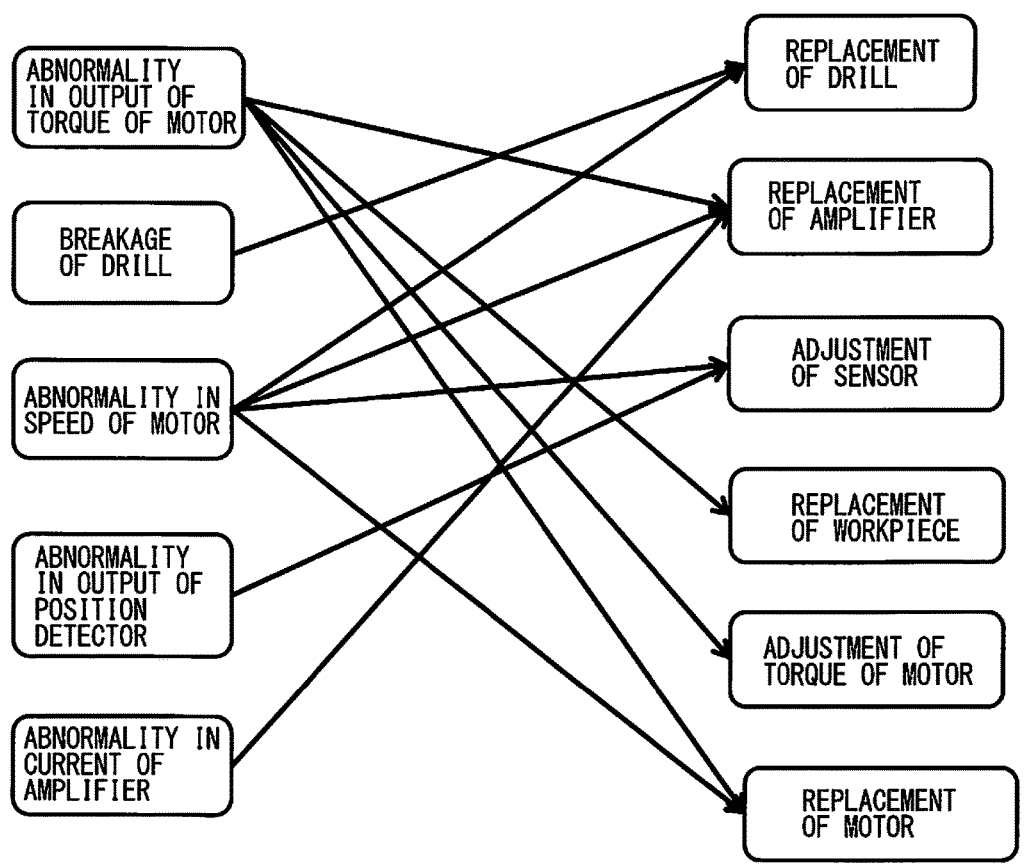
FIG. 3 is a view of another embodiment of correlation data.

FIG. 3 shows another mode of the correlation data. A state in which stopping is possible (stopping state) is extracted from the state of each manufacturing machine, and the correlation between a cause of each stopping state and an actual recovery operation is made. In this mode, the stopping state occurring in a given manufacturing machine and the recovery operation can be applied to a different machine in a different line.

Note that, though FIG. 2 shows that each piece of the state information contained in the breakdown information is written using language, it is also possible that, for example, error codes composed of multi-digit numbers representing various kinds of states which may occur in each manufacturing machine are written in place of the language. Regarding the recovery operation information, it is preferable that operation codes composed of multi-digit numbers input by the input unit 22 are written in place of the language described in FIG. 2.

The characteristic operation of the cell controller 12 according to the present embodiment will be described below.

The cell controller 12 according to the present embodiment stores the correlation data including the breakdown information and the recovery operation information in the database of the host computer 13. This operation will be described with reference to FIGS. 1 and 4.

Figure 4:
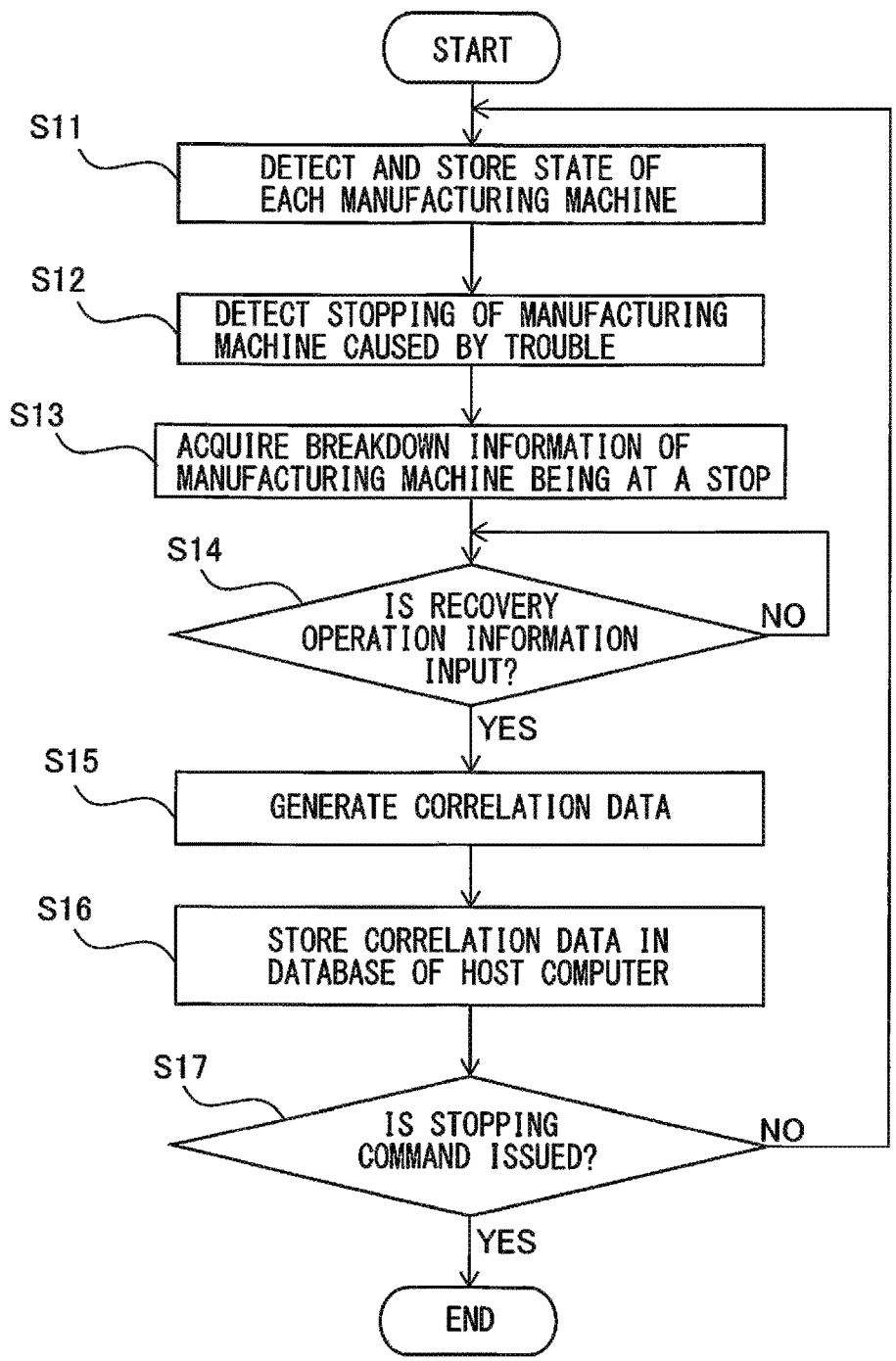
FIG. 4 is a flowchart of an operation procedure for generating correlation data including the breakdown information and error recovery information of a manufacturing machine and storing the correlation data in a database of a host computer.

FIG. 4 is a flowchart of the procedure for generating the correlation data including the breakdown information and the recovery operation information, and storing the same in the database of the host computer 13.

The cell controller 12 controls the manufacturing machines 14 to 16 in the manufacturing cell 11, thereby starting to produce products. In such production of products, the states of the manufacturing machines 14 to 16 are detected by the sensors 19 at predetermined time intervals, and are successively stored in the state storing unit 20 (step S11).

Subsequently, the breakdown information acquiring unit 21 detects, in real time, a stopping of a given manufacturing machine caused by trouble, from among the state information of each of the manufacturing machines 14 to 16, which is stored in the state storing unit 20 (step S12). For example, the fact, that the output of the sensors 19 mounted in a given manufacturing machine is lower than a predetermined value, causes a stopping of the manufacturing machine caused by trouble to be detected. With this detection, the breakdown information acquiring unit 21 acquires the breakdown information of the manufacturing machine, which has stopped due to trouble, from among the state information of each of the manufacturing machines 14 to 16, which is stored in the state storing unit 20 (step S13).

Subsequently, whether the recovery operation information is input from the input unit 22 to the recovery operation information storing unit 23 is determined (step S14). The step S14 does not shift to a subsequent step until it is determined that the recovery operation information is input in step S14. Thus, it is preferable that, when the breakdown information acquiring unit 21 acquires the breakdown information of the manufacturing machine as described above, the cell control device 12 causes, for example, a light source device or a sound source device to execute an external alert regarding the fact that the input of the recovery operation information is pending.

When it is determined that the recovery operation information has been input in step S14, the correlation data generating unit 24 generates correlation data (step S15). The correlation data are a data set obtained by correlating the identification information of the manufacturing machine being at a stop, the breakdown information acquired as described above, and the recovery operation information that has been input, with one another. Subsequently, the correlation data generating unit 24 transmits the correlation data to the host computer 13, thereby storing the same in the database of the host computer 13 (step S16).

Subsequently, in step S17, whether or not a stopping command is issued to the cell controller 12 is determined. When the stopping command is issued, the process for generating and storing the correlation data ends. In contrast, when no stopping command is issued, the process returns from step S17 to step S11, and the processes in steps S11 to S16 are executed again. Repeating these processes causes the correlation data to be accumulated in the database of the host computer 13.

Further, the cell controller 12 according to the present embodiment can retrieves, when acquiring the breakdown information, the recovery operation information corresponding to the breakdown information from the database of the host computer 13, and submits the same to an operator. This operation will be described with reference to FIGS. 1 and 5.

Figure 5:
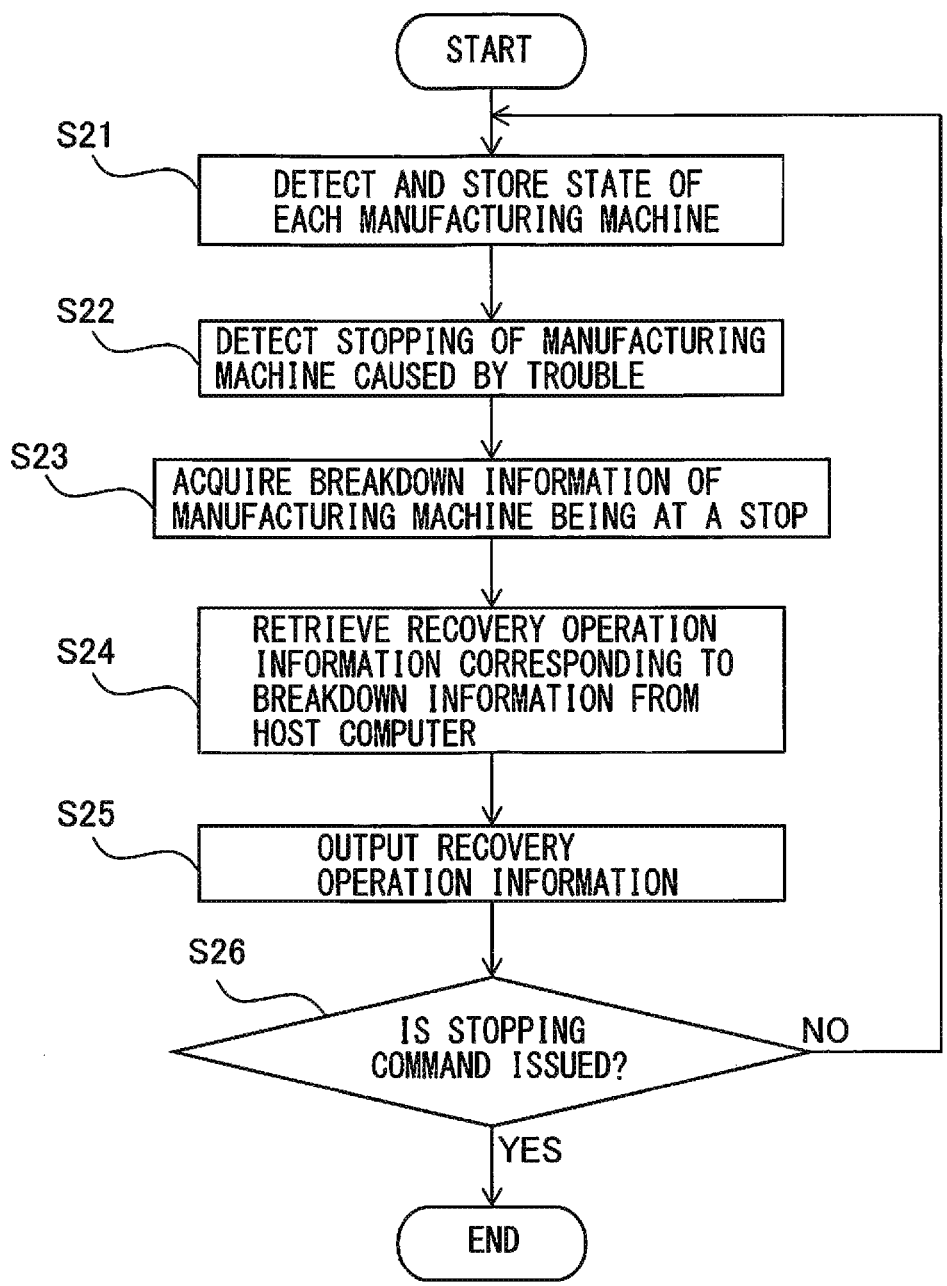
FIG. 5 is a flowchart of an operation procedure for retrieving error recovery operation information corresponding to the breakdown information of a manufacturing machine from database of a host computer.

FIG. 5 is a flowchart of the procedure for retrieving the recovery operation information corresponding to the breakdown information from the database of the host computer 13, and submitting the same.

Steps S21 to S23 shown in FIG. 5 are identical to steps S11 to S13 in FIG. 4. Thus, executing steps S21 to S23 causes the breakdown information of the manufacturing machine, which stops due to trouble, to be acquired.

Subsequently, the recovery operation information retrieving unit 25 retrieves the recovery operation information corresponding to the breakdown information acquired in step S23, from the database of the host computer 13 (step S24). Subsequently, the output unit 26 outputs the recovery operation information retrieved by the recovery operation information retrieving unit 25 (step S25). In the output unit 26, the breakdown information of the manufacturing machine that has been stopped and the recovery operation information corresponding to the breakdown information are, for example, printed on a paper or displayed on a screen. Note that the processes in steps S24 and S25 may be executed between steps S13 and S14 in FIG. 4.

Subsequently, in step S26, whether a stopping command is issued to the cell controller 12 is determined. When the stopping command is issued, the process for causing the output unit 26 to output the recovery operation information ends. In contrast, when no stopping command is issued, the process returns from step S26 to step S21, and the processes in steps S21 to S26 are executed again.

As described above, the cell controller 12 according to the present embodiment is configured to generate correlation data obtained by correlating the breakdown information representing the state of a manufacturing machine, which stops due to trouble, and the recovery operation information of the manufacturing machine, in each manufacturing machine. Such correlation data are transmitted to and accumulated in the database of the host computer 13 each time the correlation data is generated. Thus, when a given manufacturing machine stops due to trouble, the operator can extract, from the database of the host computer 13, the recovery operation information representing the content of the recovery operation performed in the past for the stopping of the given manufacturing machine. In other words, the cell controller 12 according to the present embodiment enables the operator to easily acquire the content of the recovery operation most appropriate to the breakdown information of each manufacturing machine in the manufacturing cell 11.

In particular, in the cell controller 12 according to the present embodiment, when the breakdown information of a manufacturing machine is acquired, the recovery operation information corresponding to the breakdown information of the manufacturing machine is retrieved from the database of the host computer 13, and is sent to the output unit 26. This enables the operator, specifically, a non-expert to quickly acquire the content of the recovery operation for the manufacturing machine that has been stopped, and appropriately perform the recovery operation.

Figure 6:
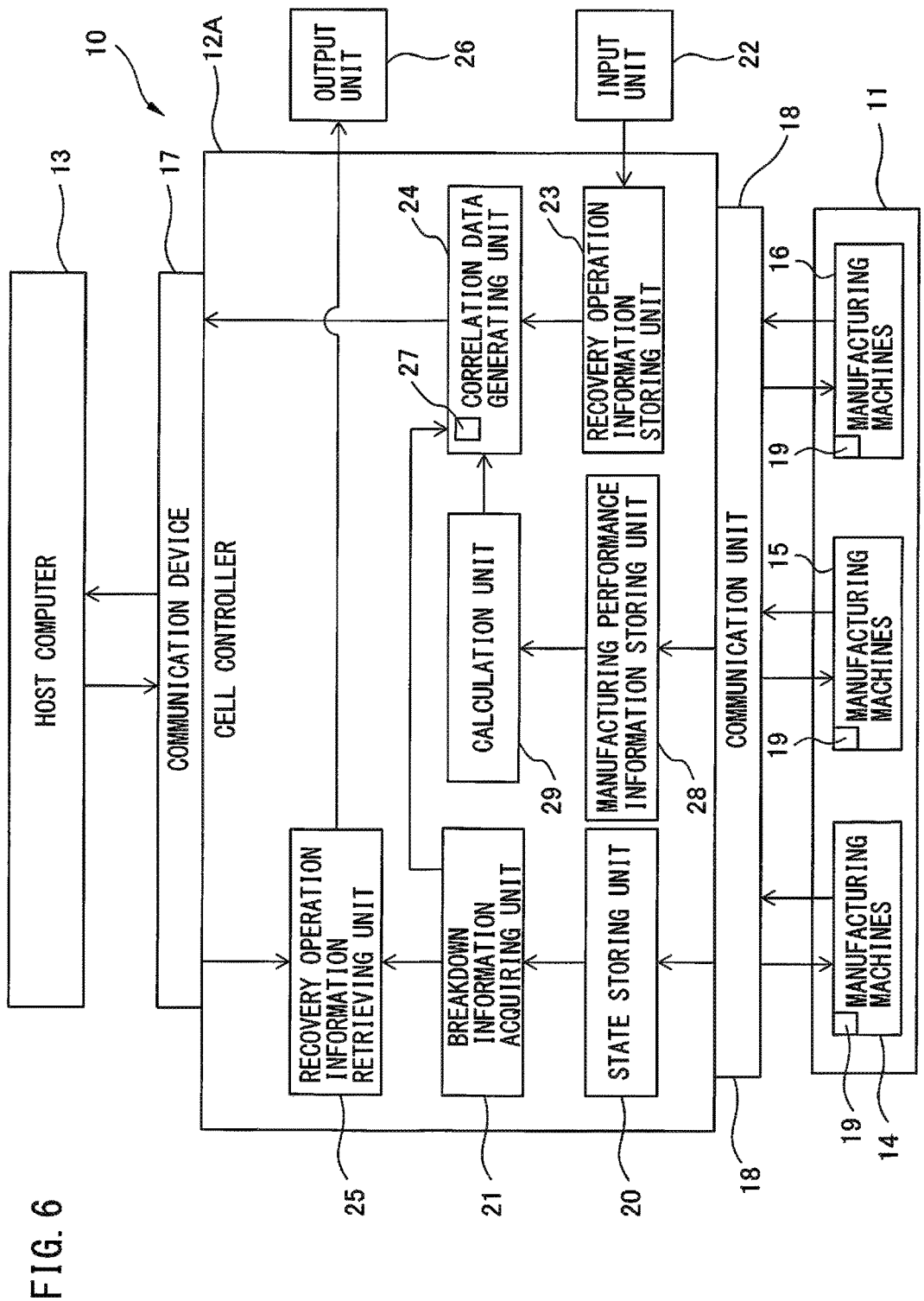
FIG. 6 is a block diagram of the configuration of a first modification of the production system shown in FIG. 1.

Next, a first modification of the cell controller 12 will be described. FIG. 6 is a block diagram of the configuration of the first modification of the cell controller 12 shown in FIG. 1.

As shown in FIG. 6, a cell controller 12A in the first modification is further provided with a learning unit 27, a production performance information storing unit 28, and a calculation unit 29 in comparison with the cell controller 12 shown in FIG. 1. The functions of these components will be successively described below.

In the cell controller 12A shown in FIG. 6, the learning unit 27 is provided in the correlation data generating unit 24. The learning unit 27 learns the correlation data generated by the correlation data generating unit 24 using, as a reward, the rate of alarm generation in or the operation rate of each of the manufacturing machines 14 to 16.

Specifically, after the recovery operation is performed for the manufacturing machine that has been stopped due to trouble, the learning unit 27 acquires the rate of alarm generation or the operation rate in a predetermined period of time from the time when the manufacturing machine is recovered. It can be determined that the suitability of the recovery operation for the manufacturing machine increases as the acquired rate of alarm generation decreases or the operation rate increases. Thus, the learning unit 27 optimizes the correlation data by giving a reward to the correlation data including the breakdown information and the recovery operation information in accordance with the rate of alarm generation in or the operation rate of the manufacturing machine.

The rate of alarm generation or the operation rate is acquired using the production performance information storing unit 28 and the calculation unit 29. In other words, the production performance information storing unit 28 stores the production performance information of each of the manufacturing machines 14 to 16 operated in accordance with control commands from the cell controller 12A. The calculation unit 29 calculates the rate of alarm generation in or the operation rate of each of the manufacturing machines 14 to 16, based on the production performance information stored in the production performance information storing unit 28.

The production performance information is used to perform, for example, the quality control of the products manufactured in the manufacturing cell 11 or the process control. Examples of the production performance information include current values of motors of manufacturing machines during manufacturing, times required for manufacturing, alarm information generated during manufacturing, programs or parameter values used for manufacturing, identification numbers of tools used for manufacturing, ambient temperatures during manufacturing, production errors measured by measuring instruments after manufacturing, etc.

In the present embodiment, the name of manufacturing machines, production time, the number of processed workpieces, the number of alarms, etc., are included in the production performance information. The identification numbers specific to manufacturing machines are used as the name of manufacturing machines. The production time is a time necessary for a given manufacturing machine to process a workpiece. The number of processed workpieces is the number of workpieces that have been processed by a given manufacturing machine. The number of alarms is the number of alarms generated while a given manufacturing machine processes workpieces. Note that the output of, for example, a sound source or a light source disposed in each manufacturing machine, in order to inform an abnormality of the corresponding manufacturing machine, is used as an alarm.

In the calculation unit 29, for example, the rate of alarm generation is calculated as follows. The rate of alarm generation can be found by dividing the number of alarms by the production time or the number of manufacturing machines in the manufacturing cell 11. Alternatively, the rate of alarm generation may be found by dividing the time during which a manufacturing machine stops due to alarm generation and continues to stop, by the time during which the manufacturing machine should essentially operate. Alternatively, the time during which a manufacturing machine stops due to alarm generation and continues to stop may be directly treated as the rate of alarm generation. These methods for calculating the rate of alarm generation are examples, and the present invention is not limited to these methods. The calculation unit 29 may also calculate the operation rate instead of the rate of alarm generation. The operation rate is found by dividing the time during which a manufacturing machine actually operates, by the time during which the manufacturing machine should essentially operate.

According to the first modification described above, the learning unit 27 can enhance the relevance between the breakdown information and the recovery operation information for each manufacturing machine in the correlation data accumulated in the database of the host computer 13.

Examples of the state storing unit 20, the recovery operation information storing unit 23, and the production performance information storing unit 28 include memory devices, such as RAMs (Random Access Memories). Alternatively, examples of the state storing unit 20, the recovery operation information storing unit 23, and the production performance information storing unit 28 include stationary disk devices, such as hard disks, or portable storage devices, such as flexible disks, optical disks, etc.

Figure 7:
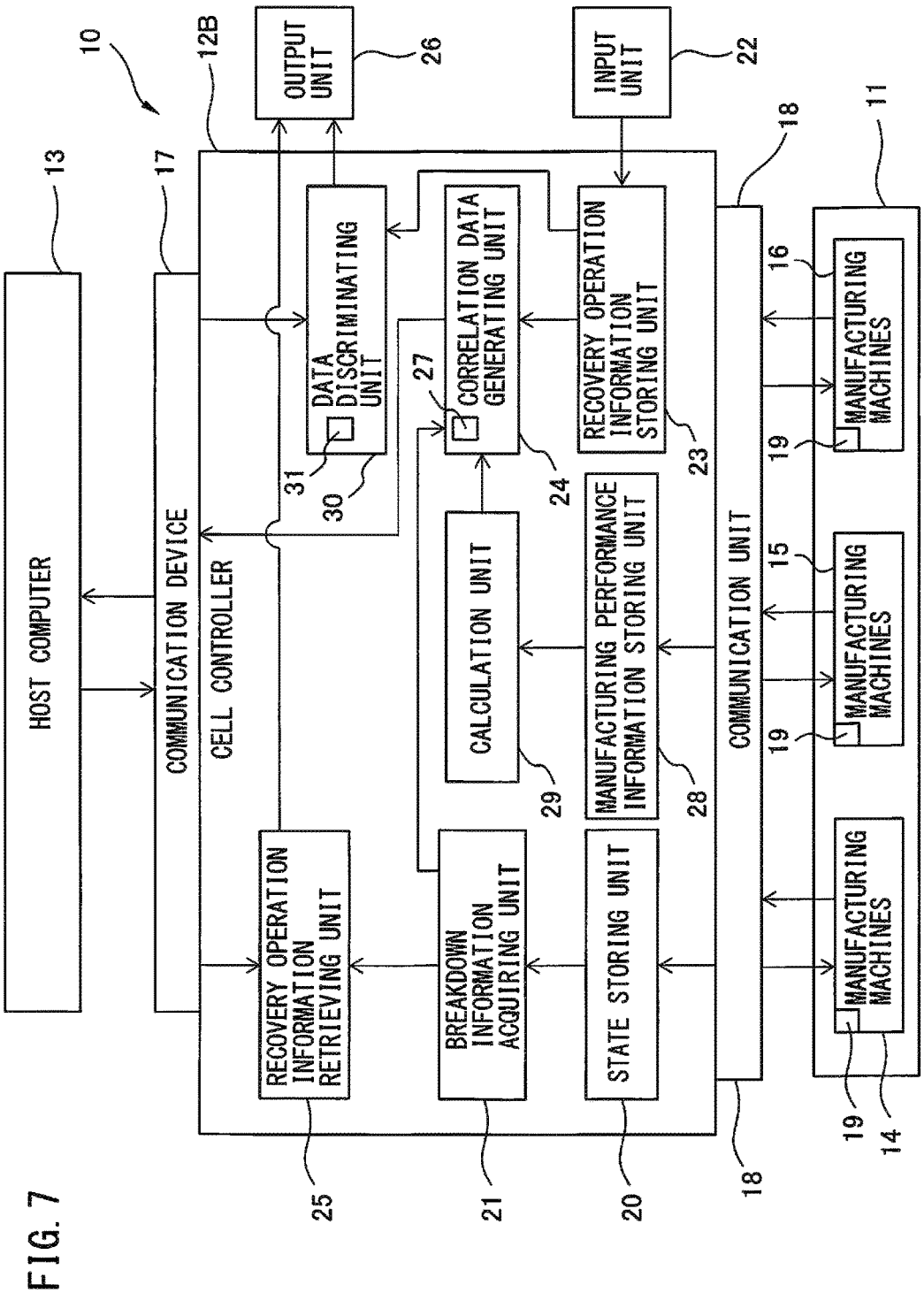
FIG. 7 is a block diagram of the configuration of a second modification of the production system shown in FIG. 1.

A second modification of the cell controller 12 will be described. FIG. 7 is a block diagram of the configuration of the second modification of the cell controller shown in FIG. 1.

As shown in FIG. 7, a cell controller 12B in the second modification is further provided with a data discriminating unit 30 and a learning unit 31 in comparison with the cell controller 12A shown in FIG. 6. The functions of these components will be successively described below.

The data discriminating unit 30 compares the recovery operation information input from the input unit 22 to the recovery operation information storing unit 23 with a plurality of correlation datum accumulated in the database of the host computer 13 as described above. When the data discriminating unit 30 finds recovery operation information similar to the recovery operation information, which has been input, from among the correlation data in the database, the data discriminating unit 30 sends the similar recovery operation information and its associated breakdown information, to the output unit 26. In this respect, it is preferable that the recovery operation information and the breakdown information are printed on a paper or displayed on a screen in the output unit 26, in order to submit them to the operator.

In the cell controller 12B in the second modification, the operator predicts the content of a recovery operation for the manufacturing machine that has been stopped, and inputs the recovery operation information representing the content of the recovery operation from the input unit 22 to the recovery operation information storing unit 23. When the recovery operation information similar to the recovery operation information that has been input is present in the database of the host computer 13, the similar recovery operation information and its associated breakdown information are output by the output unit 26. This enables the operator to know the stopping state of the manufacturing machine, for which a recovery operation similar to the predicted recovery operation is performed. In other words, the cell controller 12B in the second modification enables the operator to understand whether the predicted recovery operation is suitable for the current stopping state of the manufacturing machine. Further, the operator can easily predict a more suitable recovery operation from the breakdown information of the manufacturing machine, for which the recovery operation information similar to the predicted recovery operation is generated.

Figure 8:
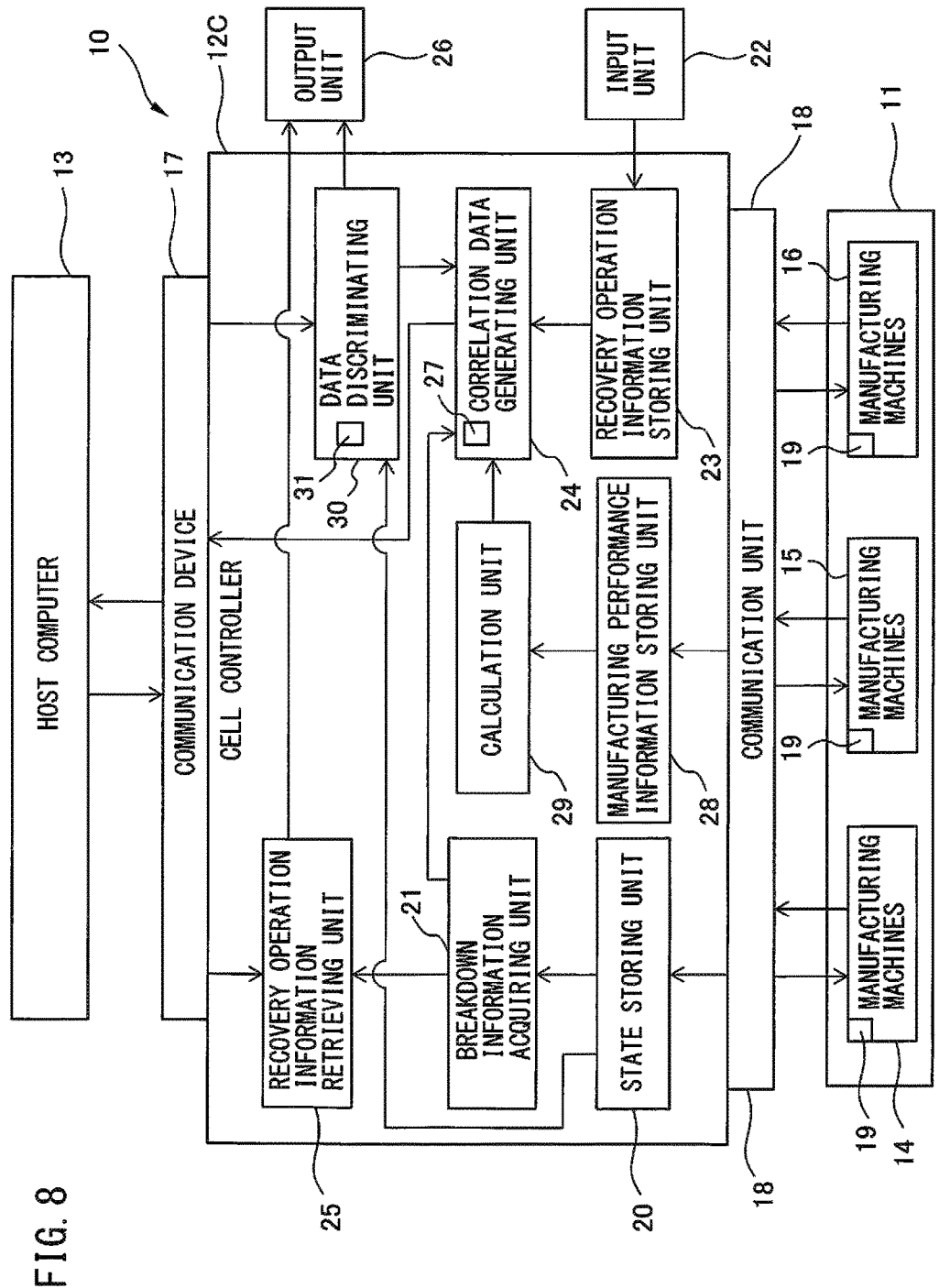
FIG. 8 is a block diagram of the configuration of a third modification of the production system shown in FIG. 1.

A third modification of the cell controller 12 will be described. FIG. 8 is a block diagram of the configuration of the third modification of the cell controller shown in FIG. 1.

As shown in FIG. 8, similar to the second modification, a cell controller 12C in the third modification is further provided with a data discriminating unit 30 and a learning unit 31, in comparison with the cell controller 12A shown in FIG. 6. However, as will be described below, the functions of these components are different from those in the second modification.

As shown in FIG. 8, the data discriminating unit 30 compares the breakdown information acquired from the state storing unit 20 by the breakdown information acquiring unit 21 with the correlation data accumulated in the database of the host computer 13 as described above. The data discriminating unit 30 finds out breakdown information similar to the acquired breakdown information from among the correlation data in the database, and outputs the similar breakdown information to the output unit 26. The data discriminating unit 30 also calls recovery operation information associated with the similar breakdown information from the database, and outputs the same to the output unit 26. In this respect, it is preferable that the recovery operation information and the breakdown information are printed on a paper or displayed on a screen by the output unit 26, in order to submit them to the operator. Alternatively, the similar breakdown information may be found out before the actual stopping occurs, i.e., prediction of stopping is acceptable.

In the cell controller 12C in the third modification, a state similar to the breakdown information can be discriminated from the state information of a manufacturing machine in the state storing unit 20. The recovery operation information associated with the similar breakdown information can be read out, using the similar breakdown information, from the database of the host computer 13. Further, the output unit 26 outputs the similar breakdown information and its associated recovery operation information. This enables the operator to know the state of the manufacturing machine, similar to specific breakdown information, i.e., a portent of stopping. In other words, the cell controller 12C in the third modification can predict a possible stopping of a manufacturing machine from the state of the manufacturing machine. The operator can perform, for example, prevention of a stopping or preparation of a recovery operation by previously acquiring the predicted breakdown information.

However, when the accuracy in discrimination of similarity in the data discriminating units 30 in the second and third modifications is low, the breakdown information associated with a recovery operation which differs greatly from the recovery operation predicted by the operator is unexpectedly output. In this instance, the operator may misunderstand that the predicted recovery operation is suitable. Thus, it is preferable that the learning unit 31 is provided in each data discriminating unit 30. In other words, it is preferable that the learning unit 31 of the cell controller 12B in the second modification is configured to learn a criterion with respect to which the similarity between the recovery operation information contained in each of the correlation data of the database and the recovery operation information input in the recovery operation information storing unit 23 is discriminated. In contrast, it is preferable that the learning unit 31 of the cell controller 12C in the third modification is configured to learn a criterion with respect to which the similarity between the breakdown information contained in each of the correlation data of the database and the stop information of the manufacturing machine, which has been input to the state storing unit 20, is discriminated. In particular, these learning units 31 learn such discriminating criteria for similarity, for example, the rate of concordance of data, using, as a reward, the rate of alarm generation in or the operation rate of each of the manufacturing machines 14 to 16.

Specifically, after the operator performs the recovery operation predicted as described above in order to recover a manufacturing machine, the learning unit 31 acquires the rate of alarm generation or the operation rate in a predetermine period of time from the time when the manufacturing machine is recovered. It can be determined that the suitability of the predicted recovery operation increases as the acquired rate of alarm generation decreases or the operation rate increases. Thus, the learning unit 31 learns a criterion most appropriate to discrimination of similarity in the data discriminating unit 30 by giving a reward, which corresponds to the rate of alarm generation in or the operation rate of the manufacturing machine, to the discriminating criterion for similarity, for example, the rate of concordance of data. Furthermore, similar to the first modification, it is preferable that the rate of alarm generation or the operation rate is acquired using the production performance information storing unit 28 and the calculation unit 29.

As described above, in the cell controller 12B in the second modification and the cell controller 12C in the third modification, the discriminating criterion for similarity in the data discriminating unit 30 is optimized by providing the learning unit 31 in the data discriminating unit 30.

The learning units 27 and 31 (hereinafter referred to as "machine learning apparatus) will now be described in detail. The machine learning apparatus has a function for analytically extracting useful rules or knowledge representations, criteria for determination, etc., from the assembly of data input to the apparatus, and a function for outputting the results of determination, and learning knowledges. There are various machine learning methods, and the methods are roughly divided into "supervised learning", "unsupervised learning", and "reinforcement learning". In order to achieve these leaning methods, there is another method referred to as "deep learning" for learning extraction of feature quantity itself.

"Supervised learning" is a method in which a large volume of input-output (label) paired data are given to a machine learning apparatus, so that characteristics of these datasets can be learned, and a model for inferring an output value from input data, i.e., the input-output relation can be inductively acquired. This can be achieved using an algorithm, for example, a neural network that will be described later.

"Unsupervised learning" is a method in which a large volume of input-only data are given to a machine learning apparatus, so that the distribution of the input data can be learned, and a device for, for example, compressing, classifying, and fairing the input data can be learned even if the corresponding teacher output data are not given. For example, characteristics of these datasets can be clustered based on their similarity. The result obtained from the learning is used to set a certain criterion, and then, the allocation of output is performed so as to optimize the criterion, so that the prediction of output can be achieved. There is another problem setting method situated between "unsupervised learning" and "supervised learning", which is known as "semi-supervised learning". In this learning method, a small volume of input-output paired data and a large volume of input-only data are provided.

Problems are set in reinforcement learning as follows.

A machine learning apparatus observes the state of environment, and decides an action.

The environment varies in accordance with some rules, and a user's action can vary the environment.

A reward signal is returned at each action.

The target of maximization is the sum of (discount) rewards to be obtained now and in the future.

Learning starts from the state in which a result caused by an action is completely unknown, or is incompletely known. The machine learning apparatus can acquire the result as data only after it actually starts operating. In other words, it is necessary to search the optimal action through trial and error.

It is also possible to set, as an initial state, the state in which a prior learning (e.g., the above supervised learning, or inverse reinforcement learning) is performed so as to emulate the action of a person, and start learning from an appropriate starting point.

"Reinforcement learning" is a learning method for learning not only determinations or classifications but also actions, thereby learning an appropriate action based on the interaction of environment to an action, i.e., an action to maximize rewards to be obtained in the future. This indicates, in the present embodiment, that an action, which can exert an effect on the future, can be acquired. The explanation of reinforcement learning will be continued below using, for example, Q-learning, but reinforcement learning is not limited to Q-learning.

Q-learning is a method for learning a value $Q(s, a)$ at which an action a is selected under an environmental state s. In other words, it is only required that the action a having the highest value $Q(s, a)$ is selected as an optimal action a, under a given state s. However, initially, the correct value of the value $Q(s, a)$ for a combination of the state s and the action a is completely unknown. Then, the agent (the subject of an action) selects various actions a under a given state s, and gives rewards to the actions a at that time. Thus, the agent learns selection of a more beneficial action, i.e., the correct value $Q(s, a)$.

As a result of the action, maximization of the sum of rewards to be obtained in the future is desired, and accordingly, Q(s, a)=E[Σγ$^t$r$_t$] is aimed to be finally achieved (An expected value is set for the time when the state varies in accordance with the optimal action. As a matter of course, the expected value is unknown, and accordingly, should be learned while being searched). The update expression for such a value Q(s, a) is given, for example, by:

$$Q(s_t, a_t) \leftarrow Q(s_t, a_t) + \alpha\left(r_{t+1} + \gamma \max_a Q(s_{t+1}, a) - Q(s_t, a_t)\right) \quad \text{Equation (1)}$$

where $s_t$ is the state of environment at time t, and $a_t$ is the action at time t. Upon the action $a_t$, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by γ. γ is the parameter having a range of 0<γ≤1, and is called discount rate. α is the learning factor, and has a range of 0<α≤1.

This equation expresses a method for updating an evaluation value $Q(s_t, a_t)$ of an action $a_t$ in a state $s_t$ based on a reward $r_{t+1}$ which has been returned as a result of a trial $a_t$. If an evaluation value $Q(s_{t+1}, \max a_{t+1})$ of the optimal action max a in a subsequent state caused by the reward $r_{t+1}$+ the action a is greater than the evaluation value $Q(s_t, a_t)$ of the action a in the state s, $Q(s_t, a_t)$ is increased. In the contrary case, i.e., the evaluation value $Q(s_{t+1}, \max a_{t+1})$ is smaller than the evaluation value $Q(s_t, a_t)$, $Q(s_t, a_t)$ is decreased. In other words, the value of a given action in a given state is tried to approach the reward immediately returned as a result, and the value of an optimal action in the subsequent state caused by the given action.

Examples of the method for expressing Q(s, a) on a computer include a method for preserving the values of all state action pairs (s, a) as a table (action-value table), and a method for preparing a function to approximate Q(s, a). In the latter method, the above update expression can be achieved by adjusting a parameter of the approximate function using a method, such as stochastic gradient descent. Examples of the approximate function include a neural network that will be described later.

Figure 9:
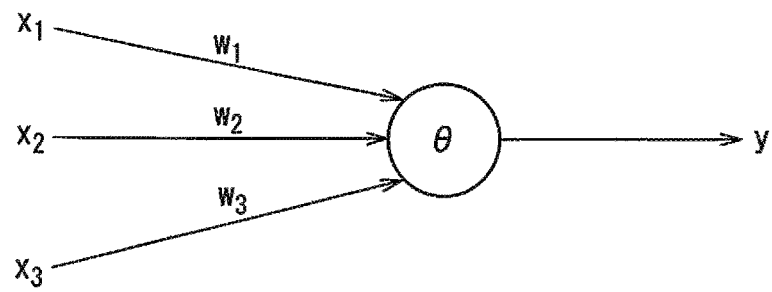
FIG. 9 is a schematic diagram of a neuron model.

As an approximate algorithm of a value function in supervised learning, unsupervised learning, and reinforcement learning, a neural network can be used. The neural network is comprised of, for example, an arithmetic device and a memory, which realize a neural network simulating a neuron model as shown in FIG. 9. FIG. 9 is a schematic diagram illustrating a neuron model.

As shown in FIG. 9, a neuron outputs an output y in response to a plurality of inputs x (inputs x1 to x3 are provided herein as an example). Weights w (w1 to w3) are applied to the corresponding inputs x1 to x3. This causes the neuron to output the output y that is expressed by the equation below. Note that the inputs x, the output y, and the weights w are vectors.

$$y = f_k(\Sigma_{i=1}^{n} x_i w_i - \theta)$$

where θ is the bias, and $f_k$ is the activation function.

Figure 10:
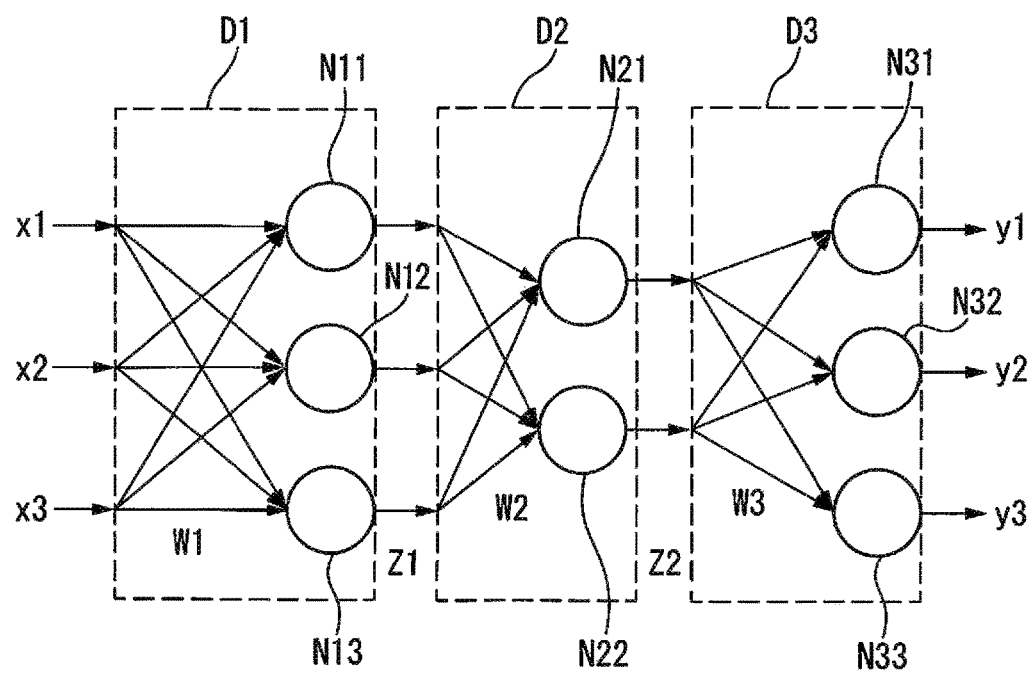
FIG. 10 is a schematic diagram of a three-layer neural network model.

A three-layer weighted neural network comprised of a combination of neurons as described above will now be described below with reference to FIG. 10. FIG. 10 is a schematic diagram illustrating a weighted neural network having three layers D1 to D3.

As shown in FIG. 10, a plurality of inputs x (inputs x1 to x3 are provided herein as an example) are input from the left side of the neural network, and results y (results y1 to y3 are provided herein as an example) are outputted from the right side of the neural network.

Specifically, the inputs x1 to x3, to which the corresponding weights have been applied, are respectively input to three neurons N11 to N13. These weights applied to the inputs are collectively designated by w1.

The neurons N11 to N13 respectively output z11 to z13. These z11 to z13 are collectively designated by a feature vector z1, and can be treated as a vector obtained by extracting a feature amount of an input vector. This feature vector z1 is a feature vector between the weight w1 and the weight w2.

The feature vectors z11 to z13, to which the corresponding weights have been applied, are input to two neurons N21 and N22. These weights applied to the feature vectors are collectively designated by w2.

The neurons N21 and N22 respectively output z21 and z22. These z21 and z22 are collectively designated by a feature vector z2. This feature vector z2 is a feature vector between the weight w2 and the weight w3.

The feature vectors z21 and z22, to which the corresponding weights have been applied, are input to three neurons N31 to N33. These weights applied to the feature vectors are collectively designated by w3.

Finally, the neurons N31 to N33 respectively output the results y1 to y3.

The operation of the neural network includes a learning mode and a value prediction mode. A learning dataset is used to learn the weights w in the learning mode, and parameters obtained from the learning are used to determine the action of the processing machine in the prediction mode (For convenience, the term "prediction" is used herein, but various tasks including detection, classification, deduction, etc., can be performed).

It is possible to perform not only learning (online learning), in which data that have been acquired by actually operating the processing machine in the prediction mode are immediately learned, and are reflected in a subsequent action, but also learning (batch learning), in which previously collected data are collectively learned using a group of the data, and thereafter, a detection mode is performed using parameters obtained from the learning. Another learning mode can be interposed every time a predetermined amount of data is collected.

The weights w1 to w3 can be learned by an error back propagation method. The information on errors is introduced from the right side to the left side. The error back propagation method is a method for adjusting (learning) each weight so as to reduce a difference between the output y when the input x is input and the true output y (teacher) in each neuron.

In such a neural network, three or more layers can be provided (This is called deep learning). An arithmetic device, which extracts features from input data, in a stepwise fashion, so as to return a result, can be automatically acquired from only teacher data.

Note that reinforcement learning, a method of machine learning, for example, Q-learning, is applied to the learning unit 27 shown in FIG. 6 and the learning unit 31 shown in FIGS. 7 and 8. Of course, the machine learning method applicable to the learning units 27 and 31 is not limited to Q-learning. When, for example, supervised learning is applied to the learning units 27 and 31, the value functions correspond to learning models, and the rewards correspond to errors.

The present invention has been described above using exemplary embodiments. However, a person skilled in the art would understand that the aforementioned modifications and various other modifications, omissions, and additions can be made without departing from the scope of the present invention.

Effect of the Invention

According to one aspect of the present invention, storing, when a manufacturing machine in the manufacturing cell stops, the information on a recovery operation most appropriate to the manufacturing machine, and updating the recovery operation into optimal one enable the operator to easily acquire contents of the recovery operation. According to another aspect of present invention, the operator, specifically, a non-expert can quickly and appropriately perform the recovery operation for the manufacturing machine being at a stop.

According to the another aspect of the present invention, the learning unit can enhance the relevance between the breakdown information and the recovery operation information of each manufacturing machine in the correlation data accumulated in the database of the host computer.

According to the another aspect of the present invention, the operator can confirm whether or not the predicted recovery operation is suitable for the recovery of the manufacturing machine, based on the recovery operation information output from the correlation data and the corresponding breakdown information of the manufacturing machine.

According to the another aspect to the present invention, the operator can predict a stopping of a manufacturing machine, and prepare a recovery operation therefor, based on the state information of the manufacturing machine and the breakdown information of the manufacturing machine, which is similar to the state information.

According to the another aspect of the present invention, providing the learning unit in the data discriminating unit causes the similar discriminating criterion in the data discriminating unit to be optimized.

What is claimed is:

1. A cell controller, which is communicably connected to a host computer having a database and which controls a manufacturing cell containing a plurality of manufacturing machines, the cell controller comprising:
   a plurality of sensors which detect a state of each of the plurality of manufacturing machines;
   a state storing unit which stores the state of each of the manufacturing machines detected by the sensors;
   a breakdown information acquiring unit which is configured to acquire breakdown information of each of the manufacturing machines, from state information of each of the manufacturing machines, which is stored in the state storing unit;
   an input unit which enables an input of recovery operation information to the cell controller when each of the manufacturing machines stops;
   a recovery operation information storing unit which stores the recovery operation information of each of the manufacturing machines, which is input by the input unit;
   a correlation data generating unit which is configured to for each of the manufacturing machines, generate correlation data obtained by correlating (i) the breakdown information acquired by the breakdown information acquiring unit with (ii) the recovery operation information stored by the recovery operation information storing unit, and
   transmit the generated correlation data to the database; and
   a data discriminating unit which is configured to compare the recovery operation information input from the input unit to the recovery operation information storing unit, with the plurality of correlation data accumulated in the database,
   wherein
   when the data discriminating unit finds out recovery operation information similar to the recovery operation information input to the recovery operation information storing unit, from among the plurality of correlation data accumulated in the database, the data discriminating unit is configured to send the similar recovery operation information and the breakdown information associated with the recovery operation information, to an output unit.

2. The cell controller according to claim 1, further comprising:
   a recovery operation information retrieving unit which is configured to retrieve, in accordance with the breakdown information acquired by the breakdown information acquiring unit, recovery operation information corresponding to the breakdown information, from the database; and
   the output unit configured to output the recovery operation information retrieved by the recovery operation information retrieving unit.

3. The cell controller according to claim 1, wherein the correlation data generating unit comprises a learning unit which is configured to learn the correlation data, using, as a reward, the rate of alarm generation in or the operation rate of each of the manufacturing machines.

4. The cell controller according to claim 3, further comprising:
   a production performance information storing unit which stores production performance information of each of the manufacturing machines; and
   a calculation unit which is configured to calculate the rate of alarm generation in or the operation rate of each of the manufacturing machines, on the basis of the production performance information of each of the manufacturing machines stored in the production performance information storing unit.

5. The cell controller according to claim 1, wherein the data discriminating unit comprises a learning unit which is configured to learn a criterion for discriminating similarity between the recovery operation information contained in each of the correlation data in the database and the recovery operation information input in the recovery operation information storing unit, using, as a reward, the rate of alarm generation in or the operation rate of each manufacturing machine.

6. A production system for managing a working situation of a plurality of manufacturing machines, the production system comprising:
   a cell controller according to claim 1, which is configured to control at least one manufacturing cell containing the plurality of manufacturing machines; and
   a host computer having a database, which is communicably connected to the cell controller.

* * * * *